May 21, 1946. E. C. OKRESS 2,400,777
ELECTRICAL POWER ABSORBER
Filed Dec. 15, 1942
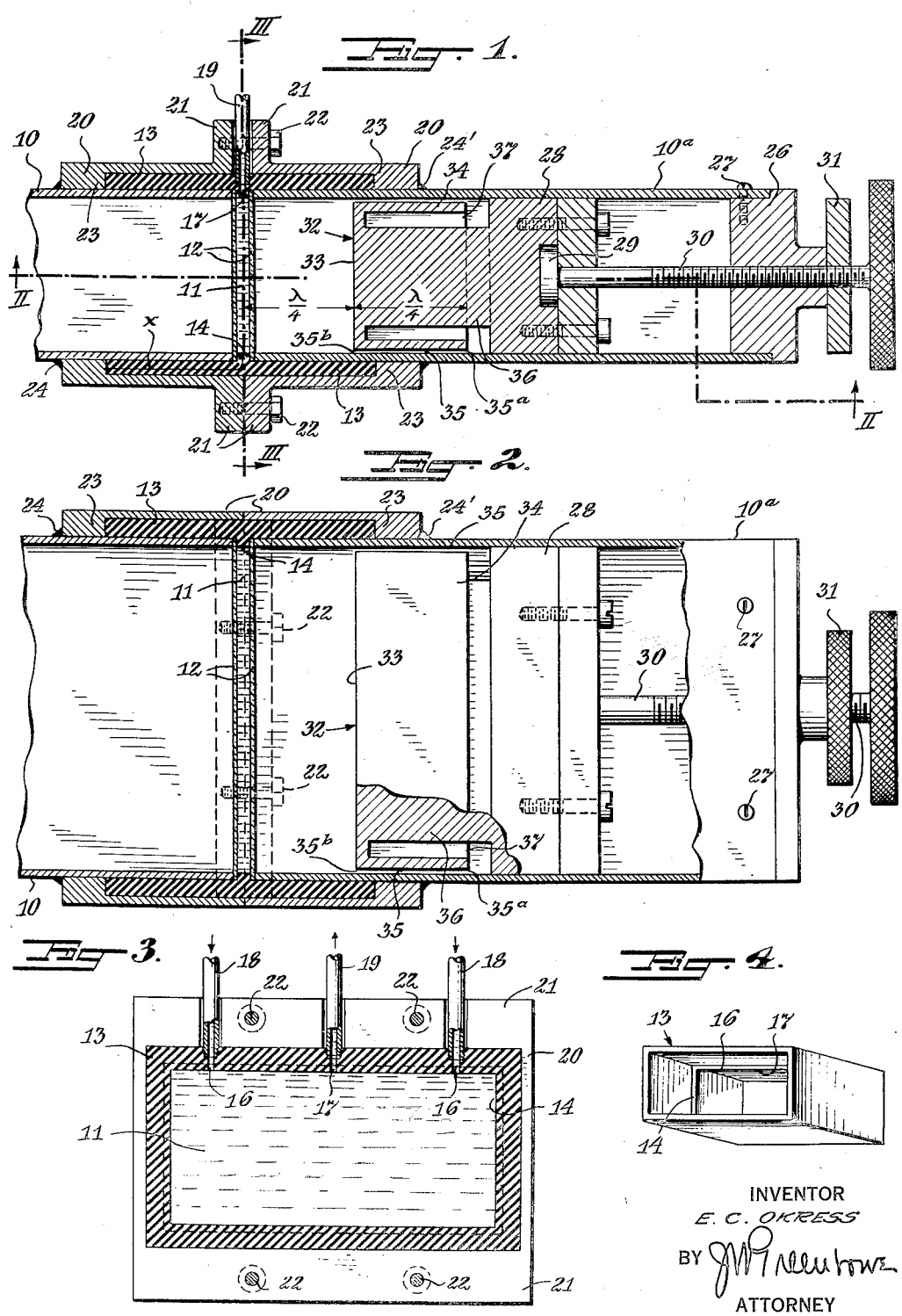
INVENTOR
E. C. OKRESS
BY [signature]
ATTORNEY Patented May 21, 1946

2,400,777

UNITED STATES PATENT OFFICE 2,400,777

ELECTRICAL POWER ABSORBER

Ernest C. Okress, Montclair, N. J., assignor to Westinghouse Electric Corporation, East Pittsburgh, Pa., a corporation of Pennsylvania Application December 15, 1942, Serial No. 469,086

6 Claims. (Cl. 219—47)

This invention relates to electrical power absorbers and more particularly to that type of device employed in the electrical art in conjunction with calorimeters for measurement of electrical power at the micro-wave region and in connection with electrical power propagated within a wave guide.

It has been found that the measurement of electrical power at the micro-wave region has entailed various difficulties and that accentuation of the difficulties follows the increase to higher powers. Among the inadequacies of present-day electrical power absorbers, especially those involving high electrical power, are the presence of sliding joints in the path of high current flow, and the presence of large heat capacity of the absorbing apparatus.

Objects of the present invention accordingly include the provision of an electrical power absorbing apparatus which will overcome the difficulties and short-comings of the prior art apparatus of the same general character.

More specifically, an object of the invention is to provide an electrical power absorber which entirely avoids sliding contact between mechanical parts in the direct path of high current flow.

Another object of the invention is to keep the heat capacity of the electrical power absorber to a minimum.

A further object of the invention is to reduce the reflection factor of the electrical power absorber to a very low order.

Yet another object of the invention is to provide an instrument adapted for absorbing for measuring purposes relative electrical power, if so desired, as well as for measuring full electrical power.

Other objects of the invention include provision of an electrical power absorber which can be readily and economically constructed, installed and used.

Still further objects of the invention will appear to those skilled in the art as the description progresses, both by direct reference thereto and by implication from the context.

Referring to the accompanying drawing in which like numerals of reference indicate similar parts throughout the several views:

Figure 1 is a longitudinal section of a portion of a wave guide and showing the present invention in connection therewith;

Figure 2 is another longitudinal section, the same being taken on line II—II of Fig. 1;

Figure 3 is a cross-sectional view on line III—III of Fig. 1; and

Figure 4 is a perspective view of the dielectric frame forming part of the calorimeter.

In the specific embodiment of the invention illustrated in said drawing, the reference numeral 10 designates a wave guide wherein microwave electrical energy is present which it is desired to measure. For that purpose, the wave guide is interrupted and my improved electrical power absorber applied to the end thereof.

The electrical power absorber of the present invention provides an impedance matching section across the end of the wave guide, said section preferably providing a fluid chamber, containing a fluid which is preferably water, and said chamber having a face area substantially the size and shape of the end of the wave guide. The said chamber is defined at its front and back faces by dielectric plates 12, 12 of polystyrene, glass or other suitable material. The dielectric constant of the plates, thickness of the plates and thickness of the water film in the water chamber are all of predetermined values and will be discussed hereinafter. Said dielectric plates are parallel and are sealed water-tight in a suitable tube-like frame 13 of insulative material. Within said frame, preferably midway between and parallel to end planes thereof, is provided a frame-like rib 14 projecting inwardly from the several walls of frame 13. In other words, the complete rib provides a top reach and a bottom reach having corresponding ends thereof joined by side reaches all formed integrally with each other at meeting ends and all longitudinal integral with the body portion of frame 13. Holes 16, 17 are provided in the present showing at intervals along the upper reach of the rib. These holes, appropriately enlarged at their outer ends, open outwardly through the top wall of the frame and receive pipe connections 18, 19, of which those designated by numerals 18 are inlets for water or the like and the one designated by numeral 19 is an outlet. A plurality of connections are provided for assuring improved heat exchange.

The means for mounting the frame consists of a pair of metallic engirdling cleats 20, one at the forward half of the dielectric frame and one at the rear half thereof and each having top and bottom outwardly projecting flanges 21 at their meeting ends bolted together as at 22. Forward direction used in this description is arbitrarily used to agree with direction of propagation of the wave energy in the wave guide. The forward end of the forward cleat and the rear end of the rear cleat, that is to say, the ends of the cleats most distant from each other, have inwardly directed rims or enlargements 23 beyond and in engagement with the ends of the dielectric frame, said enlargements having a thickness equal to that of the walls of the dielectric frame 13. The inside peripheral face of the enlargement 23 of the rear cleat and the inside face of rear half of the dielectric frame 13 are in surface engagement with the several faces of the wave guide 10, which, in assembly, extends within the rear half of the dielectric frame 13 and its cleat 20 up to and with its end in engagement with dielectric plate 12 at the rear side of rib 14. A fillet of solder 24 is employed for securing the cleat in place on the wave guide.

In corresponding manner, a wave guide end section 10a corresponding in cross section to the dimensions of wave guide 10 is positioned with its rear end within the forward part of the dielectric frame 13 and within forward cleat 20, the enlargement 23 whereof is in surface engagement with the outer surface of the wave guide end section. A corresponding fillet of solder 24' secures the cleat in position on the said wave guide end section. Plates 12, 12 are cemented, or otherwise made watertight at their margins next the rib and thus provide in conjunction with the rib the said chamber 11 for water or other fluid. The rib preferably only protrudes a distance equal to the thickness of the wave guide wall, and thus the area of the chamber face looking into the wave guide is the same as the cross-sectional area of the wave guide.

The construction thus far described accordingly situates dielectric frame 13 within a metallic pocket formed between the cleats and the wave guide and wave guide extension. The contiguous longitudinal dimensions of the dielectric and pocket are equal and the ends of the dielectric are flat in a plane perpendicular to the wave guide. The length following a forward path from the first encountered flat end of the dielectric forwardly to the rib 14 and then inwardly to the face of the rib forming the peripheral boundary of the water chamber, said path length being designated by line $x$, is half a wave in the dielectric of the frame for the wave in the wave guide. This obtains the effect of electrical continuity for the high frequency current across the gap from the end of the wave guide to the end of the wave guide end section.

Briefly, the principle of the device as illustrated in Figure 2 of the present disclosure may be described in the following manner. The proposed micro-wave power absorber is comprised of five sections or media through which the micro-wave energy is propagated. It is proposed that the medium 11 be the dissipative fluid in which the micro-wave energy is converted into heat. The quantity of heat absorbed by the fluid per unit of time is a function of the temperature difference between the ambient and the rise in temperature due to the amount of heat absorbed, the volume of liquid per unit time flowing, its density and specific heat. In principle, the instrument is primarily a micro-wave flow calorimeter.

The problem is to obtain the ratio of the reflected to incident transverse electromagnetic fields a minimum at the extreme left face of the first plate 12 and to absorb the transmitted energy in the fluid 11. In order to keep the specific heat of the apparatus to a minimum, the quantity of fluid should be kept low if its specific heat in comparison with the surrounding material is high.

It remains to determine the proper thickness of the plates 12, the fluid 11 and the space between the second or extreme right plate 12 and the face 33 of the piston, such that the ratio of the reflected to incident electromagnet energy is maintained at a minimum at a given wave length. Plates 12 are preferably chosen very thin and arbitrarily a figure may be placed upon this thickness which should be very small compared to a wave length in the dielectric referred to the wave guide wave length. It may be convenient to choose a thickness of the fluid 11 such that the return path through the fluid reduces its energy by $$\frac{1}{e^2}$$

where $e$ is the base of natural logarithms.

It remains to determine the space between the extreme right plate 12 and the face of the piston 33. This can be done either experimentally by adjusting the pistons 32 or mathematically. Mathematically the process is to set up the transverse electric or magnetic wave components for the fields in the various media in terms of the thickness propagation constant and impedances in the various sections. Then the transverse fields at the boundaries are equated such that the resultant ratio of the reflected to incident fields may be evaluated. The necessary condition for the minimum resultant ratio of the reflected to incident energy at the extreme left face of plate 12 is obtained by equating the denominator of the resultant expression to zero.

An acceptable material for the plates 12, as well as for the frame is polystyrene, but special glass or other suitable dielectrics may be used if desired. Furthermore, in order to keep the calorimeter heat capacity to a minimum, its bulk or mass is made as small as possible consistent with the purpose in mind.

The instrument is adapted in principle to measurement of full power or for measurement of relative power. When used for measurement of relative power, it is constructed to present a thinner film of fluid in chamber 11 than when used for measurement of full power. In other words, impedance match of the load is effected by the thickness of the fluid film. Some adjustment of the end section 10a for matching purposes will also be required and a means for effecting the same will now be described.

Matching in end section 10a is preferably obtained by means avoiding sliding parts at junctions which carry intense H. F. currents. In the construction shown, end section 10a is rectangular metallic tubing of the same cross-sectional dimensions as the wave guide 10. For constructional purposes, the forward end of said end section is provided with a removable end wall 26 held in place, by screws 27, in said end section and constituting what may be appropriately designated from a use standpoint as a fixed end wall. Within the end section is what may be designated a piston guide 28 and which in effect is a movable end wall, the peripheral edges of which have fitting engagement with the interior of the end section. Said piston guide 28 is shown as made of two laminations, held together by screws so as to rotatably receive and retain a flange 29 provided at the end of an operating screw 30. Said operating screw is threaded through the fixed end wall 26 and is adapted to be secured in desired position by a lock nut 31.

At the inner side of piston guide 28 is mounted a piston 32 of rectangular cross section and of somewhat less size than the interior dimensions of the end section so that the piston will not have engagement at any part thereof with the walls of the end section. The piston is preferably constructed with an inwardly facing end wall 33 and with a skirt portion 34 directed longitudinally of the end section toward the outer or forward end thereof. This skirt portion is also spaced from the peripheral walls of the end section, so there is a peripheral gap 35 the entire length of the skirt between it and the walls of the said end portion. A central stem 36 within the skirt projecting from the inside of the end wall 33 of the piston to the piston guide 28, constitutes means for rigidly supporting the piston from said guide. The depth of the skirt is made to be substantially a free space quarter wavelength in the medium present in reference to the Holl mode. A high impedance is presented at the open end 37 of the piston 32 across the end 35a of gap 35 and a low impedance results across the end 35b of gap 35. The construction accordingly has the effect of electrical continuity between the walls of the end section and the open end of skirt 34 of the piston without introducing a sliding contact thereat, and accomplishes a most desirable purpose, as a sliding contact connecting those parts is generally electrically undesirable and mechanically detrimental.

In the construction and use of the present device, it is to be understood that micro-wave electrical energy of a certain wavelength existing in the wave guide is to be measured by measuring its heating effect upon the fluid in the chamber 11, the rate of flow and temperature change of which are measured by other apparatus not here shown. It is sought to make it clear that the present apparatus is built for a definite wavelength of the micro-wave electrical energy to be measured, and for a different wavelength different proportions and/or calibrations are required. The wavelength in the wave guide is the standard of reference of wavelengths herein referred to as existing in other parts such as wave guide end section and in the dielectrics.

I claim:

1. An electrical power absorber for microwave electrical power, comprising a frame and dielectric plates forming a relatively thin fluid chamber therein, said chamber having fluid therein, means for maintaining a fluid circulation in said chamber, and means perpendicular to said plates for transmission of microwave electrical energy to and from said fluid chamber.

2. An electrical power absorber for microwave electrical power, comprising a frame and dielectric plates forming a relatively thin fluid chamber therein and said chamber having fluid therein, said plates having refractive indices such that their products substantially equal the square of the index of refraction of the fluid in said chamber thereby reducing the reflection factor of the assembly of said plates and fluid therebetween to a low order.

3. An electrical power absorber for microwave electrical power, comprising a frame and dielectric plates forming a fluid chamber therein, an end section at one side of said frame, and electrical microwave tuning means for said end section.

4. An electrical power absorber for microwave electrical power, comprising a wave guide and a wave guide end section aligned therewith, means interposed between the said wave guide and wave guide end section for converting high frequency microwave electrical energy to heat, circulating means absorbing said heat for measuring purposes, and impedance matching means for obtaining effect of electrical continuity from one wall of the wave guide to the aligned wall of the wave guide end section through the gap presented by the said interposed means.

5. An electrical power absorber for microwave electrical power, comprising a wave guide and a wave guide end section aligned therewith, means interposed between the said wave guide and wave guide end section for converting high frequency microwave electrical energy to heat, and tuning means for said microwave electrical energy in said end section, said tuning means presenting a gap and effect of electrical continuity thereacross from the tuning means to the wave guide end section independent of physical contact therebetween.

6. An electrical power absorber for microwave electrical power, comprising a wave guide and a wave guide end section aligned therewith, means interposed between the said wave guide and wave guide end section for converting high frequency electrical wave energy to heat, a piston in said wave guide end section out of contact from the walls of said wave guide end section and providing a chamber a quarter wavelength deep for obtaining effect of electrical continuity between the piston and said walls independent of physical contact therebetween, and means for supporting and adjusting the position of said piston in the said end section for tuning purposes.

ERNEST C. OKRESS.